March 13, 1956 W. C. FOSTER 2,738,194

SOUND TRANSLATING APPARATUS

Filed May 12, 1950 2 Sheets-Sheet 1

INVENTOR

William C. Foster

BY Raymond W. Wolton

ATTORNEY

March 13, 1956 W. C. FOSTER 2,738,194

SOUND TRANSLATING APPARATUS

Filed May 12, 1950 2 Sheets-Sheet 2

INVENTOR
William C. Foster
BY Raymond W. Colton
ATTORNEY

United States Patent Office 2,738,194

Patented Mar. 13, 1956

2,738,194

SOUND TRANSLATING APPARATUS

William C. Foster, Baltimore, Md., assignor to The Gray Manufacturing Company, a corporation of Connecticut Application May 12, 1950, Serial No. 161,531

7 Claims. (Cl. 274—12)

This invention relates to sound translating apparatus and is particularly concerned with the cooperative aspects of the stylus and indexing arrangements employed in such apparatus.

Whereas it is highly desirable to effect rapid indexing movements between a sound record and a stylus when such stylus and record are out of engagement, and in many cases when the parts are set to a transcribing condition, records are frequently seriously damaged by effecting such indexing movements while the parts are set for recording conditions. After an operator becomes experienced in the use of sound translating equipment of the type here under consideration, indexing while the stylus is set for transcribing becomes more or less subconscious. Consequently, even such experienced operators will occasionally impart an indexing movement to the apparatus, thoughtlessly, while the stylus assumes a recording position with respect to the record medium. It is with a view towards preventing such damage to sound records by novices and experienced operators alike, that the present invention has been evolved, and accordingly, it is among the major objects of this invention to provide apparatus for sound translating uses wherein the usual indexing operator is rendered inoperative during such periods as the stylus assumes a recording position.

The sound translating apparatus of the present invention comprises a frame supporting a record carriage, a stylus adjustably carried by the frame for movement in a first path towards and from the carriage for cooperation with a record mounted on the carriage, driving means imparting relative sound translating movement to the stylus and record in a second path, indexing means including a manual operator and a transmission for imparting relative movement in a third path to the carriage and stylus, a clutch interposed between the operator and transmission, and an actuator operatively related with the stylus and clutch to disengage the clutch upon a predetermined movement of the stylus in the first path. The record carriage is preferably relatively movably supported by the frame, and more specifically, rectilinearly movably supported. The movement of the stylus towards and from the carriage may occur in a vertical plane while the sound translating movement and indexing movement will in such case occur in a horizontal plane or planes. The sound translating movement may be arcuate and the indexing movement normal thereto. The manual operator for the indexing means is preferably rendered ineffective when the recording stylus is in engagement with a record. The clutch may include biasing means for effecting its disengagement, in which event the actuator will oppose the biasing means in effecting disengagement of the clutch. The clutch preferably includes a plurality of toothed members and the actuator is preferably common to the stylus and clutch to disengage certain of the toothed members upon movement of the recording stylus towards the carriage. More specifically, the clutch may include a train of bevel gears interposed between the operator and transmission and the actuator will be common to the stylus and an intermediate gear of the train. Such an arrangement of bevel gears may be utilized to reverse the motion applied to the manual operator.

A more complete understanding of the invention will follow from a detailed description of the drawings wherein.

Figure 1:
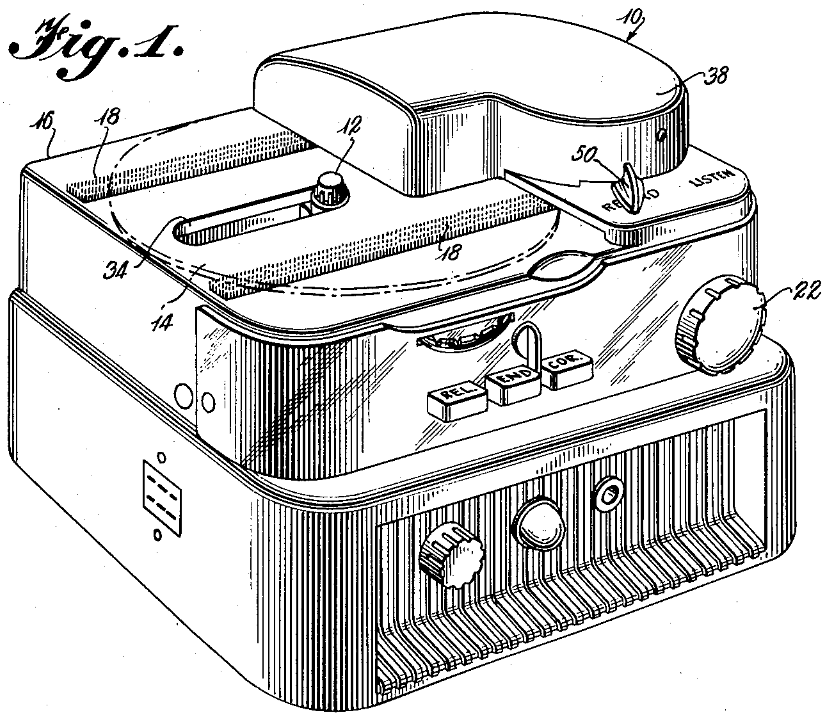
Fig. 1 is a perspective view of sound translating apparatus incorporating the present invention.

The sound translating apparatus of Fig. 1 is a recorder-reproducer 10 having a spindle 12 which receives a disc record 14 containing a central opening of serrated form to receive the complementary splines of the spindle 12. The table 16 provided by the frame of the machine provides a pair of plush or other pile fabric strips 18 to support the record slightly above the surface of the table itself. The position of the spindle 12 and its carriage 20 with respect to the table is adjustable under the control of the manual operator or knob 22 through a clutch 24 and a transmission including a cable 26 and suitable pulleys 28 and 30. The carriage 20 is supported for rectilinear movement with respect to the table by guide rods 32, an elongated slot 34 being provided in the table to permit corresponding movement of the spindle 12 projecting therethrough.

Figures 3, 4, 5:
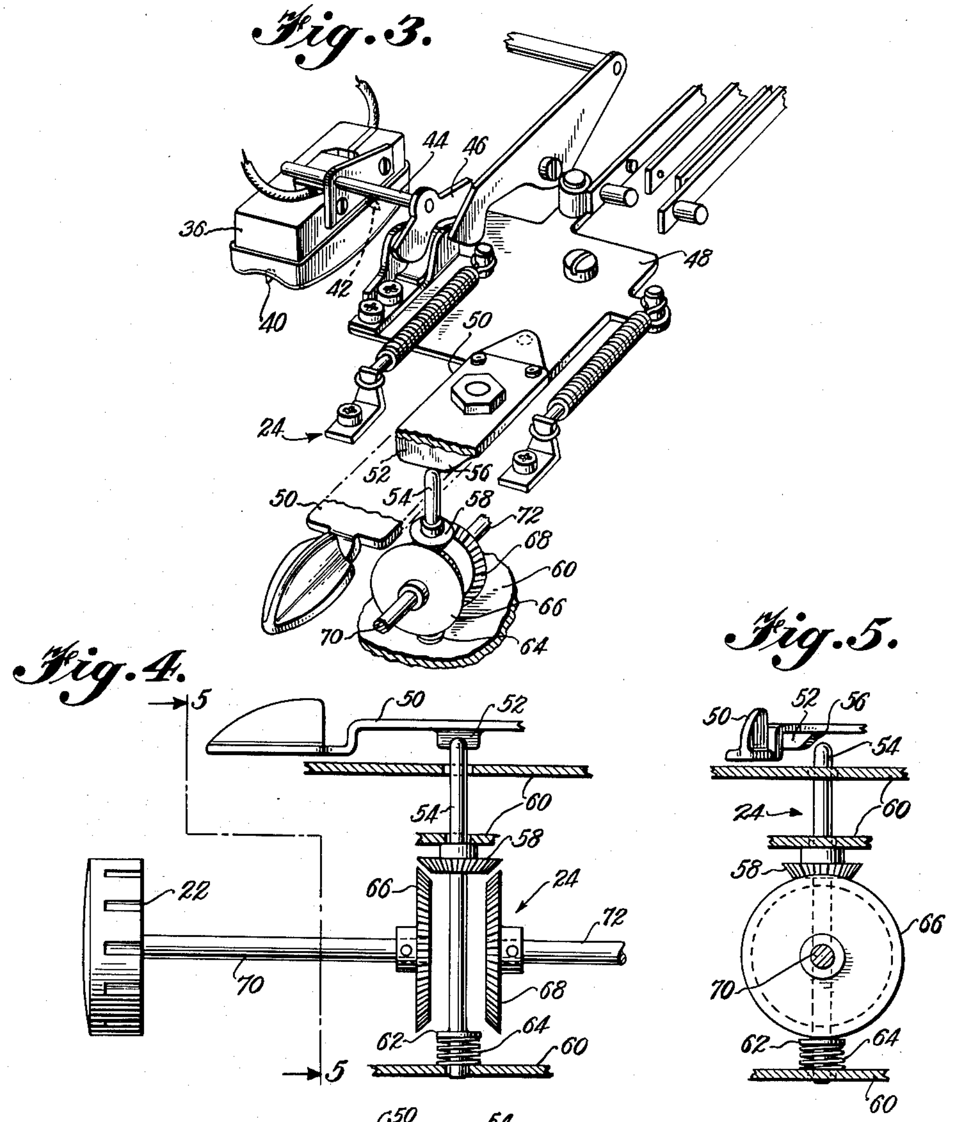
Fig. 3 is a fragmentary perspective view depicting the sound translating head and clutch actuator arrangement.
Fig. 4 is a fragmentary side elevation depicting the clutch and related parts shown in Fig. 3.
Fig. 5 is a front elevation, partially in section taken along line 5—5 of Fig. 4.

The sound translating head 36 housed within the cover 38, carries a reproducing stylus 40 and a recording stylus 42. The head is carried by a shaft 44, suitably supported for pivotal movement with respect to the frame, in a manner not shown, a cam 46 being suitably secured to the shaft for the transmission of movement through a cam actuator 48 from an actuator, second manual operator, or lever 50. As viewed in Fig. 1, the lever 50 assumes a recording position under which circumstances, the head 36 would be rocked to a position rendering its recording stylus 42 engageable with a record disc 14. In an intermediate or central position of the lever 50, the head 36 would be rocked to an intermediate position as depicted in Fig. 3 during which neither of the styli would engage a record disc. In its other extreme position, the lever 50 would rock the head to a position in which its reproducing stylus 40 would engage the record disc for a transcribing operation.

The lower surface of the lever or actuator 50 carries a cam 52 for engagement with a shaft 54 for positions of the actuator corresponding to neutral and transcribing positions of the head 36. The cam 52 is provided with a portion 56 of reduced thickness so that in the position of the actuator 50 corresponding with the recording position of the head 36, the cam 52 will clear the shaft 54. The shaft 54 has secured thereto a bevel gear or coupling member 58, the lower end of the shaft being suitably supported for reciprocating movement by a portion of the frame 60, an intermediate portion of the shaft 54 receiving a pin or flange 62, between which and the frame, a spring 64 is interposed. Near the upper portion of the shaft 54, another portion of the frame 60 serves as a guide and a stop to limit the uppermost position of the shaft with respect to its actuating cam 52. The bevel gear 58 serves as the coupling element of a clutch which also includes beveled gears 66 and 68. The driving bevel gear 66 is suitably secured to a shaft 70 to which the manual operator or knob 22 is also secured. This shaft is suitably mounted in bearings, which have been omitted for improved clarity, and it will be evident from an examination of Fig. 4 that with the bevel gear 58 in its elevated position under the influence of the biasing spring 64, the knob 22 will rotate freely and will not transmit indexing movements to the cable 26. The driven bevel gear 68 is secured to a shaft 72 which in turn is coupled with the transmission cable 26. When the shaft 54 is depressed by suitably positioning the actuator 50, the bevel gear 58 will establish driving engagement between the bevel gears 66 and 68 transmitting movements imparted to the knob 22, in a reversed direction, to the shaft 72 and to the carriage 20.

Figure 6:
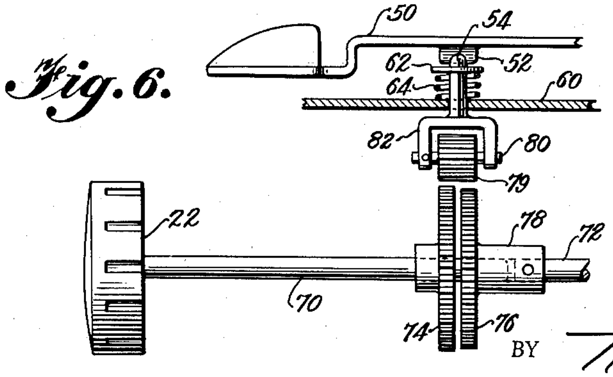
Fig. 6 is a side elevation, partially in section, depicting a modification.

In lieu of the bevel gears depicted in Figs. 4 and 5, it is contemplated that other forms of clutches having different characteristics be employed, the arrangement shown in Fig. 6 constituting but one example. In this case, a spur gear 74 is secured to the shaft 70, and a similar spur gear 76 of slightly smaller diameter is secured to a sleeve or enlarged end 78 secured in turn to the shaft 72. The purpose of the sleeve or enlarged end 78 is to provide a bearing for the end of the shaft 70. The shaft 54 in this case, shown as polygonal to prevent its rotation with respect to the frame 60, receives a pin or flange 62 near its upper end between which and the frame 60, a biasing spring 64 is interposed. Here again, the spring tends to urge the shaft 54 upwardly for engagement by the cam 52 when the actuator 50 is positioned to move the head 36 to its neutral or transcribing positions. When the actuator 50 assumes a recording position, the cam 52 will clear the end of the shaft 54 to disengage the clutch defined by the spur gears 74 and 76, and their common idler gear 79 rotatably carried on a shaft 80 received in a yoke 82 mounted on the lower end of the shaft 54.

Figure 2:
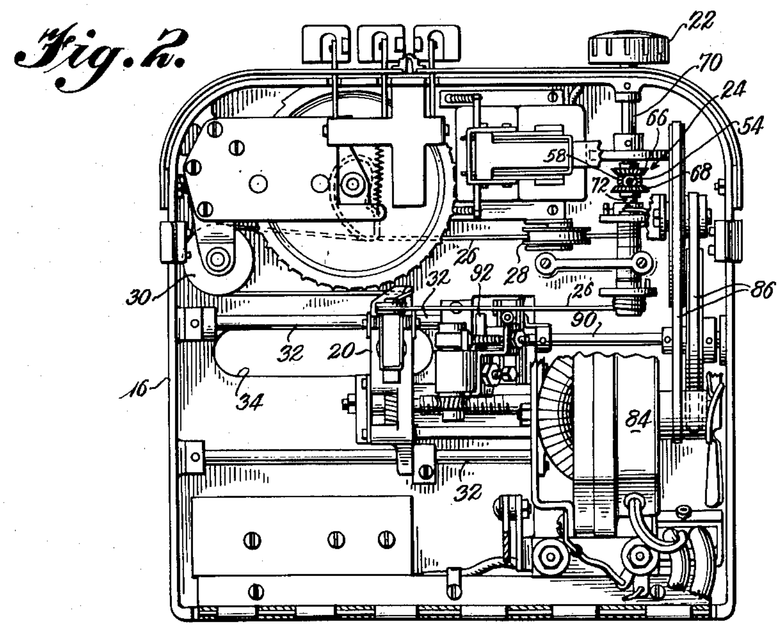
Fig. 2 is a bottom plan view of the upper portion of the apparatus.

The driving motor 84 shown in Fig. 2, and as more completely described in U. S. Patent No. 2,628,842, drives belts 86 which in turn drive a shaft 90 carrying a friction roller 92 which engages the disc record 14, in cooperation with a pressure idler roller not shown, to rotate the record and through it, the spindle 12, to provide the desired feed of the carriage 20 with respect to the styli 40 and 42 carried by the head 36.

It will thus be clear that when the actuator 50, common to the stylus and clutch assumes its "record" position, it will disengage the clutch and thereby prevent the production of relative movement between the record and stylus 42 through the knob 22.

Whereas only a limited number of examples have been shown and described by way of example, the invention should not be limited thereto beyond the scope of the appended claims.

I claim:

1. Sound translating apparatus comprising a frame supporting a record carriage, a stylus adjustably carried by said frame for movement in a first path towards and from said carriage for cooperation with a record mounted on said carriage, driving means imparting relative sound translating movement to said stylus and record in a second path, indexing means including a first manual operator having a driving element and a transmission having a driven element for imparting relative movement in a third path between said carriage and stylus, a second manual operator movable independently of the first including means for imparting movement to said stylus in said first path, and a coupling member actuated by said second manual operator establishing driving relationship between said driving and driven elements corresponding to one position of said stylus and interrupting said driving relationship between said elements corresponding to another position of said stylus.

2. Sound translating apparatus comprising a frame supporting a relatively rotatable record carriage, a stylus adjustably carried by said frame for movement in a vertical plane towards and from said carriage for cooperation with a record mounted on said carriage, driving means imparting relative sound translating movement to said stylus and record in a horizontal plane, indexing means including a first manual operator having a driving element and a transmission having a driven element for imparting another movement to said carriage in a horizontal plane, a second manual operator movable independently of the first including means for imparting movement to said stylus in said vertical plane, and a coupling member actuated by said second manual operator establishing driving relationship between said driving and driven elements corresponding to one position of said stylus and interrupting said driving relationship between said elements corresponding to another position of said stylus.

3. Sound translating apparatus comprising a frame supporting a rectilinearly movable record carriage, a stylus adjustably carried by said frame for movement in a first path towards and from said carriage for cooperation with a record mounted on said carriage, driving means imparting relative sound translating arcuate movement to said stylus and record in a second path, indexing means including a first manual operator having a driving element and a transmission having a driven element for imparting relative movement in a third path normal to said second path between said carriage and stylus, a second manual operator movable independently of the first including means for imparting movement to said stylus in said first path, and a coupling member actuated by said second manual operator establishing driving relationship between said driving and driven elements corresponding to one position of said stylus and interrupting said driving relationship between said elements corresponding to another position of said stylus.

4. Sound translating apparatus comprising a frame supporting a record carriage, a recording stylus adjustably carried by said frame for movement in a first path towards and from said carriage for cooperation with a record mounted on said carriage, driving means imparting relative sound translating movement to said stylus and record in a second path, indexing means including a first manual operator having a driving element and a transmission having a driven element for imparting relative movement in a third path between said carriage and stylus, a second manual operator movable independently of the first including means for imparting movement to said stylus in said first path, a coupling member actuated by said second manual operator establishing driving relationship between said driving and driven elements corresponding to one position of said stylus and interrupting said driving relationship between said elements corresponding to another position of said stylus, and biasing means opposing movement of said coupling member in one direction.

5. Sound translating apparatus comprising a frame supporting a record carriage, a recording stylus adjustably carried by said frame for movement in a first path towards and from said carriage for cooperation with a record mounted on said carriage, driving means imparting relative sound translating movement to said stylus and record in a second path, indexing means including a first manual operator having a toothed driving element and a transmission having a toothed driven element for imparting relative movement in a third path between said carriage and stylus, a second manual operator movable independently of the first including means for imparting movement to said stylus in said first path, and a toothed coupling member actuated by said second manual operator establishing driving relationship between said driving and driven elements corresponding to a position of said stylus remote from said carriage and interrupting said driving relationship between said elements corresponding to a position of said stylus proximate to said carriage.

6. Sound translating apparatus comprising a frame supporting a record carriage, a recording stylus adjustably carried by said frame for movement in a first path towards and from said carriage for cooperation with a record mounted on said carriage, driving means imparting relative sound translating movement to said stylus and record in a second path, indexing means including a first manual operator having a bevel gear driving element and a transmission having a bevel gear driven element for imparting relative movement in a third path between said carriage and stylus, a second manual operator movable independently of the first including means for imparting movement to said stylus in said first path, and a bevel gear coupling member actuated by said second manual operator establishing driving relationship between said driving and driven elements corresponding to a position of said stylus remote from said carriage and interrupting said driving relationship between said elements corresponding to a position of said stylus proximate to said carriage.

7. Sound translating apparatus comprising a frame supporting a record carriage, a recording stylus pivotally movable towards and from said carriage for engagement and disengagement respectively, with a record mounted on said carriage, driving means imparting rotary movement to said record relative to said stylus, indexing means including a first manual operator having a driving element and a transmission having a driven element for imparting rectilinear movement to said carriage relative to said stylus; a second manual operator movable independently of the first including means for moving said stylus away from said record, and a coupling member simultaneously actuated by said second manual operator establishing driving relationship between said driving and driven elements; said second manual operator also effecting movement of said stylus toward said record and simultaneously interrupting said driving relationship between said elements.

References Cited in the file of this patent

UNITED STATES PATENTS

| | | |
|---|---|---|
| 1,992,575 | Johnson | Feb. 26, 1935 |
| 2,259,745 | Franz | Oct. 21, 1941 |
| 2,286,346 | Clausen | June 16, 1942 |
| 2,382,607 | Clausen | Aug. 14, 1945 |
| 2,486,661 | Leitner | Nov. 1, 1949 |
| 2,548,831 | Trevitt et al. | Apr. 10, 1951 |
| 2,566,091 | Masterson | Aug. 28, 1951 |